United States Patent

[11] 3,577,838

| [72] | Inventor | Nicolaas Gradus Jan Willem Van Marle<br>Dordrecht, Netherlands |
|---|---|---|
| [21] | Appl. No. | 767,922 |
| [22] | Filed | Oct. 7, 1968 |
| [45] | Patented | May 11, 1971 |
| [73] | Assignee | Aviolanda Maatschappij voor<br>Vliegtuigbouw N.V.<br>Papendrect, Netherlands |
| [32] | Priority | Oct. 6, 1967 |
| [33] | | Netherlands |
| [31] | | 67/13,617 |

[54] AIRPORT GANGWAY
3 Claims, 3 Drawing Figs.

[52] U.S. Cl. .................................................. 14/71, 180/50

[51] Int. Cl. ........................................................ B65g 11/00
[50] Field of Search ......................................... 14/71; 180/50

[56] References Cited
UNITED STATES PATENTS

| 3,110,048 | 11/1963 | Bolton ........................... | 14/71 |
| 3,358,308 | 12/1967 | Henchbarger ................ | 14/71 |
| 3,462,784 | 8/1969 | Seipos .......................... | 14/71 |
| 3,462,787 | 8/1969 | Seipos .......................... | 14/71 |

Primary Examiner—Jacob L. Nackenoff
Attorney—Diller, Brown, Ramik & Holt

ABSTRACT: A telescoping airport gangway incorporating means for adjusting its vertical position, for lengthening and shortening it, and for pivoting it about its rear end.

Patented May 11, 1971  3,577,838

INVENTOR.
Nicolas Gradus Jan Willem Van Marle
BY
Mason, Porter, Diller & Brown
ATTORNEYS

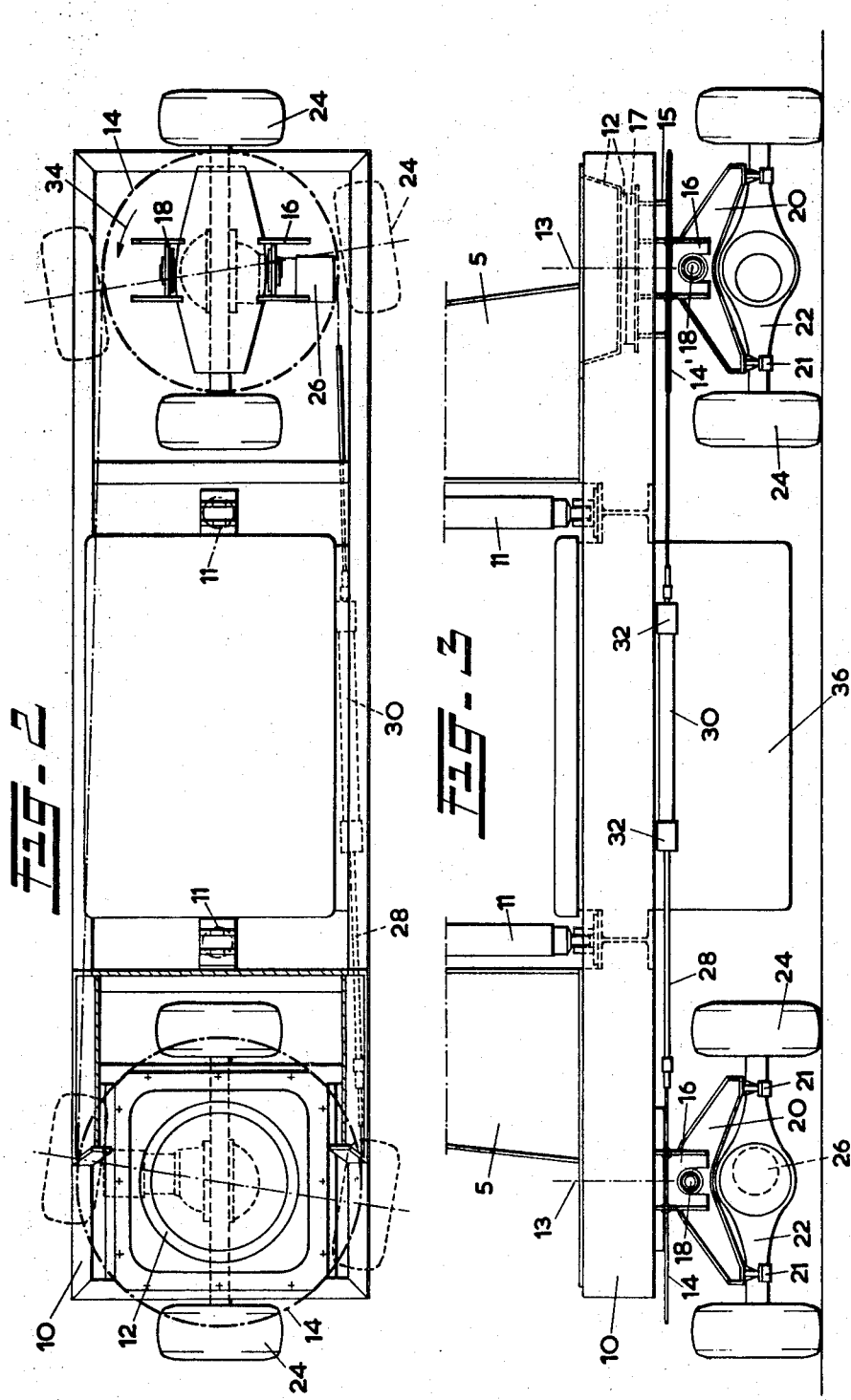

AIRPORT GANGWAY

This invention relates to an airport gangway comprising telescoping sections, one of which is suspended in a portal mounted on the chassis of a truck provided with road wheels, and guided therein for up-and-down movement.

In a known gangway constructed in this manner, the truck is provided with two pairs of spaced road wheels, each of the pairs mounted on an axle casing, each axle casing being steerable about one of two vertical shafts spaced from each other in a certain direction relative to the gangway. As a result, when the road wheels are set in the longitudinal direction of the gangway, the truck can lengthen and shorten the gangway by moving the telescoping section with which it is connected in one direction or the other, and when the wheels are set transversely of the longitudinal direction of the gangway, the truck can move the gangway in a rotary sense, the latter pivoting about its stationary end. The wheels are driven by means of a motor and differential gearing mounted in the axle casing; the wheel assemblies are rotated about their vertical axes by drive means coupled with both wheel assemblies, so that they move in a predetermined relationship.

It is an object of the present invention to improve the gangway to the extent that it becomes more stable and better operable, even when moving over irregular surfaces.

In the gangway according to the present invention, the road wheels, or if the latter are mounted on steerable axle casings, the vertical axes about which the casings are rotatable, are spaced in a direction transverse to the longitudinal direction of the gangway, and the guide means between the portal and the gangway section suspended therein keeps the portal and the gangway section in a predetermined angular position relative to each other in each vertical position of the gangway section. By virtue of this coupling, the truck with the portal is stabilized against pivoting movement in the longitudinal direction of the gangway, so that it becomes possible for all the road wheels, in the position for lengthening or shortening the gangway, to be arranged in a single row in a direction transverse to the gangway, it being possible for the wheel assemblies to be spaced a relatively large distance apart, thereby to produce any desired transverse stability. Without this transverse stability the tilting moment, for example, resulting from gale loads, must be taken up, through torsional loads on the gangway, by the structure with which the stationary end of the gangway is connected.

When the gangway is moved up and down relative to the portal, the necessity for the portal to perform a tilting movement is virtually removed owing to the fact that, for guiding the gangway section, the portal is provided with curved guideways whose radii of curvature converge towards the stationary end of the gangway. The curvature has been determined on the basis of an average position of the section suspended in the portal in the longitudinal direction of the gangway. In other positions of this section, some tilting movement of the portal is required, which, when the wheel assemblies are set in the telescoping direction, is effected about the axes of the wheels or when the brakes are applied about the line through the points of contact of the wheels with the ground. If the wheel assemblies are set in the position for horizontal pivoting movement of the gangway about the stationary end of the gangway, the tilting movement of the portal necessary when the gangway is moved up or down can be effected if, according to the invention, the truck chassis bears on each of the axle casings through a horizontal hinge shaft extending transversely of the longitudinal direction of each axle casing, the casings together with the horizontal hinge shafts being steerable about their associated vertical axis.

During the tilting movement of the portal, the gangway section carried by the portal is moved in or out, which movement remains within permissible limits owing to the curvature of the guideways referred to above.

The hinge connection with the axle casings has the additional advantage that, even on irregular surfaces, the wheels are always equally loaded two by two. Therefore, this suspension is also advantageous in constructions in which the gangway section suspended in the portal is not mounted for telescoping movement.

If, in steering the axle casings, the beams are symmetrically turned in opposite directions, it is possible to cause the axle casings to be directed towards the stationary end of the gangway in each position of the gangway telescope, so that the wheels roll truly along the ground during the horizontal pivoting movement of the gangway. For various reasons, however, it is preferable to make the axle casings rotatable in the same sense of rotation. The construction can then be kept simpler, and the drive motors, which have a certain direction of rotation for pivoting movement of the gangway, can then in principle remain geared in the same manner, for example, both motors rotate to the left for pivoting movement to the left and for lengthening the gangway.

The possibility of setting the axle casings in their proper position at all times, notwithstanding the fact that they turn in the same sense of rotation, is obtained according to the invention by virtue of the fact that each wheel suspension structure includes a horizontal steering disc rotatable about the associated vertical shaft, said disc having a different diameter from the corresponding steering disc of the other suspension structure, a common drive chain or similar element being lapped about both steering discs and being connected with drive means adapted to move said chain to and fro.

One embodiment of the invention will be described, by way of examples, with reference to the accompanying drawings, wherein:

FIG. 2 shows, on an enlarged scale, a cross section on the line II–II in FIG. 1;

FIG. 3 shows a front elevation of the construction shown in FIG. 2.

Figure 1:
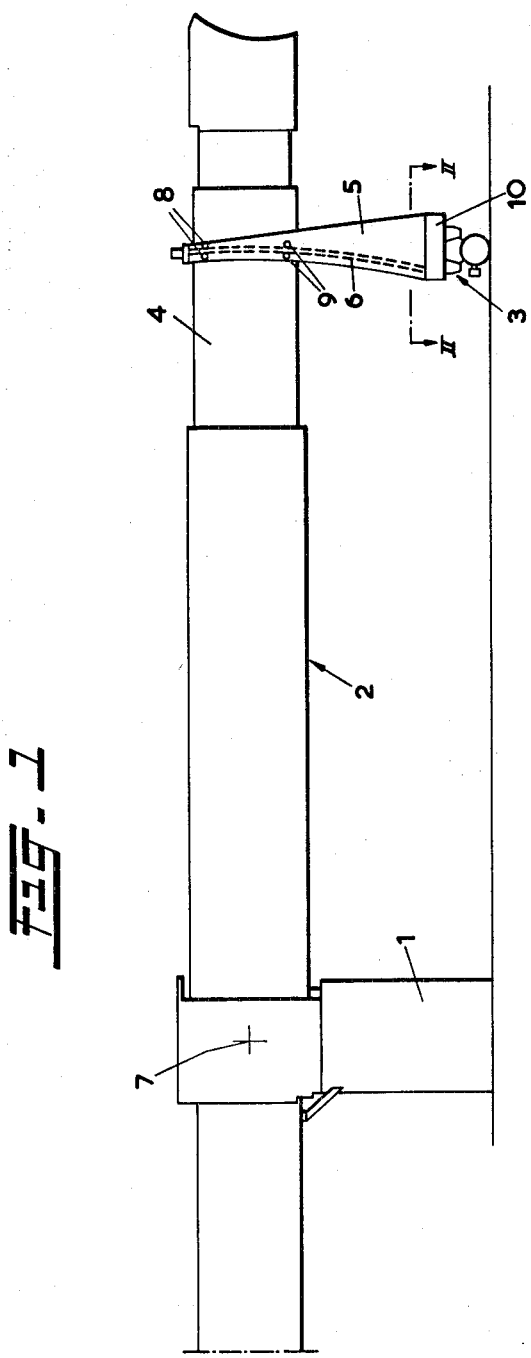
FIG. 1 shows a side view of a gangway with a truck.

In FIG. 1, 1 designates the rotunda about which the gangway 2 carried by the truck 3, is pivotable. The gangway 2 is constituted by telescoping segments or sections, section 4 of which is suspended in portal 5, which is formed integrally with the truck 3 and is provided with curved guideways 6, the center of curvature of which, in the average extended position of section 4, coincides with the transverse axis 7 extending through rotunda 1 and about which the gangway 2 is movable up and down. The section 4 is provided with pairs of upper and lower guide rollers 8 and 9, respectively, which engage the guideways 6 on opposite sides thereof, so that the gangway 2 is coupled with the portal 5 in a fixed angular relationship in each vertical position of the gangway.

Portal 5 is secured to the chassis 10 of the truck 3. Mounted on the chassis 10 are hydraulic jacks 11 for moving the gangway section 4 up and down.

Fixedly connected to the bottom of the chassis 10 are two discs 12 spaced in a direction transverse to the gangway. Mounted for rotation about a substantially vertical axis 13 under each of the discs 12 are discs 14 and 14', with a disc 17 being mounted on the tops of discs 14, 14' through connecting elements 15. The discs 12 bear on the discs 17. In the right-hand portion of FIG. 2, disc 12 has been omitted and, in the same way as in the left-hand portion the disc 14 is only indicated in ghost outline. Secured to the discs 14 14' are bearing blocks 16 in the shape of an inverted U, and mounting trunnions 18 secured to them on opposite sides of a yoke 20. Each yoke 20 is fixedly mounted on an axle casing 22, by attachment means 21. Mounted on the axle casings 22 are road wheels 24, which can be driven from a motor 26 through differential gearing accommodated in each of the casings 22. A cable 28 is lapped about both discs 14, 14' and attached to a peripheral point of each of the discs 14, 14' so as to be slip-free thereon. The ends of the cable 28 are secured to a hydraulic piston in a cylinder 30, which at 32 is welded to the chassis 10 and in which the piston can reciprocate sufficiently far for the wheel assemblies 14, 15, 16, 17, 18, 20, 21, 24 to be turned from the position for lengthening and shortening the gangway to the position for horizontal swiveling movement of the gangway. In FIG. 2, the wheels 24 are shown in dotted lines in a position for swiveling the gangway, in which position the axle casings point to the rotunda 1. To obtain this convergence with the discs 14, 14' rotating in the same direction from the position for lengthening or shortening the gangway, the disc 14 is of larger diameter than the disc 14'. For the wheels 24 to be moved from the position shown in full lines to the position shown in dotted lines requires the discs 14, 14' to be turned in the direction shown by the arrow 34.

I claim:

1. A gangway including telescoping sections and having a fixed end and a free end, a portal including a pair of spaced upstanding arms (5, 5), motor means (11, 11) connected to said gangway for raising and lowering it in a vertical plane, and guide means on said portal and gangway for guiding the movement of said gangway, the improvement wherein said arms of said portal provide curved guideways (6) for guiding said gangway in said vertical plane, said guideways having radii of curvature converging towards said fixed end of said gangway.

2. Apparatus as in claim 1 including a plurality of upper and lower guide rollers (8, 9) carried by said gangway and engaging opposite sides of said curved guideways.

3. Apparatus for supporting a gangway, said apparatus comprising a portal (5) mounted on the chassis of a truck (3) provided with road wheels (24), said truck having a pair of spaced wheel assemblies each including a separate steering disc (14, 14') each mounted for rotation about a respective vertical axis, a common elongated drive element entrained about each steering disc for rotating each disc in a common direction and including drive means for moving said drive element to and fro, the improvement comprising one steering disc (14) being larger in diameter than the other steering disc (14') for rotating said wheel assemblies at different rates.